(12) United States Patent
Harrington

(10) Patent No.: US 11,904,667 B2
(45) Date of Patent: Feb. 20, 2024

(54) VEHICLE DOOR ASSEMBLY

(71) Applicant: NISSAN NORTH AMERICA, INC., Franklin, TN (US)

(72) Inventor: Michael Harrington, Royal Oak, MI (US)

(73) Assignee: Nissan North America, Inc., Franklin, TN (US)

( * ) Notice: Subject to any disclaimer, the term of this patent is extended or adjusted under 35 U.S.C. 154(b) by 1 day.

(21) Appl. No.: 17/703,914

(22) Filed: Mar. 24, 2022

(65) Prior Publication Data

US 2023/0302880 A1  Sep. 28, 2023

(51) Int. Cl.
*B60J 5/04* (2006.01)

(52) U.S. Cl.
CPC ........... *B60J 5/0429* (2013.01); *B60J 5/0451* (2013.01)

(58) Field of Classification Search
CPC ...... B60J 5/0429; B60J 5/0451; B60J 5/0452; B60J 5/0461; B60J 5/0437; B60J 5/0443; B60J 5/0456; B60J 5/042; B60J 5/0422
USPC ......................................... 296/146.6, 187.05
See application file for complete search history.

(56) References Cited

U.S. PATENT DOCUMENTS

| | | | | |
|---|---|---|---|---|
| 7,093,886 B2 * | 8/2006 | Blust | ...................... | B60J 5/0444 296/146.6 |
| 7,341,277 B2 * | 3/2008 | Huttsell | .................. | B60J 5/0425 280/751 |
| 7,770,266 B2 * | 8/2010 | Higgins | ................ | F16B 21/086 24/297 |
| 9,688,123 B2 * | 6/2017 | Hasegawa | ............. | B60J 5/0451 |
| 11,260,731 B2 | 3/2022 | Itou et al. | | |
| 2005/0189789 A1 | 9/2005 | Schmidt | | |
| 2020/0238798 A1 * | 7/2020 | Kovie | .................... | B60J 5/0413 |
| 2020/0248487 A1 | 8/2020 | Muta et al. | | |
| 2020/0248488 A1 | 8/2020 | Muta et al. | | |
| 2020/0361395 A1 * | 11/2020 | Wheeler | ................ | H04R 1/025 |
| 2020/0408004 A1 * | 12/2020 | Contreras | .............. | E05B 77/36 |

FOREIGN PATENT DOCUMENTS

DE  102016008585 A1  2/2017

* cited by examiner

*Primary Examiner* — Amy R Weisberg
*Assistant Examiner* — Veronica M Shull
(74) *Attorney, Agent, or Firm* — Global IP Counselors, LLP

(57) ABSTRACT

A vehicle door assembly a first reinforcing bracket, a fastener and a vibration absorbing member. The first reinforcing bracket extends from a forward portion of an inner door panel to a rearward portion of the inner door panel. The first reinforcing bracket has a first main surface. The fastener is attached to the first reinforcing member such that a head portion thereof is spaced apart from of the first main surface. The vibration absorbing member has a main body with a first end and a second end. The first end has a slot that extends from an edge of the first end inward. The slot is dimensioned and shaped for sliding installation on to the fastener such that the first end of the vibration absorbing member is located between the head portion of the fastener and the first surface of the first reinforcing bracket.

20 Claims, 10 Drawing Sheets

VEHICLE DOOR ASSEMBLY

BACKGROUND

Technical Field

The present disclosure generally relates to a vehicle door assembly. More specifically, the present disclosure relates to vehicle door assembly that includes a vibration absorbing member with a slot formed therein for installation onto a pre-installed fastener thereby simplifying installation.

Background Information

Vibration absorbing members are installed at various location within vehicle structures to absorb and help distribute impact forces resulting from an impact event. These vibration absorbing members are often fitted to existing structures and can be challenging to install.

SUMMARY

One object of the present disclosure is to provide a vibration absorbing member with a slot formed therein for installation onto a pre-installed fastener thereby simplifying installation.

In view of the state of the known technology, one aspect of the present disclosure is to provide a vehicle door assembly with an outer door panel, an inner door panel, a first reinforcing bracket, a fastener and a vibration absorbing member. The inner door panel has an outer periphery fixed to a corresponding outer periphery of the outer door panel such that the outer and inner door panels define a cavity therebetween. The first reinforcing bracket extends from a forward portion of the inner door panel to a rearward portion of the inner door panel. The first reinforcing bracket has a first main surface and a second main surface opposite the first main surface. The fastener is attached to the first reinforcing member such that a head portion thereof is spaced apart from of the first main surface of the first reinforcing bracket. The vibration absorbing member has a main body with a first end and a second end. The first end has a slot that extends from an edge of the first end inward. The slot is dimensioned and shaped for sliding installation on to the fastener such that the first end of the vibration absorbing member is located between the head portion of the fastener and the first surface of the first reinforcing bracket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
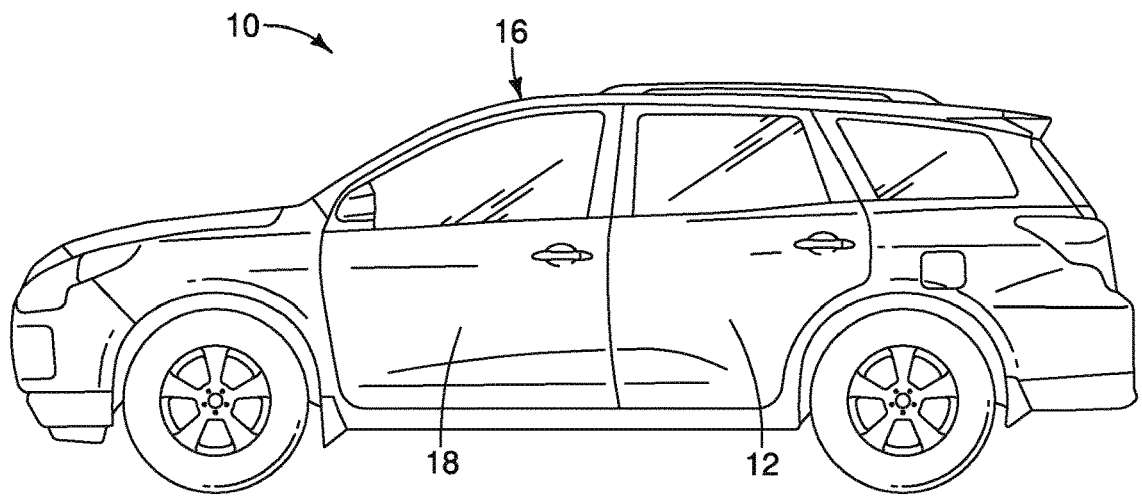
FIG. 1 is a side view of a vehicle having a door assembly in accordance with an exemplary embodiment.
Figure 2:
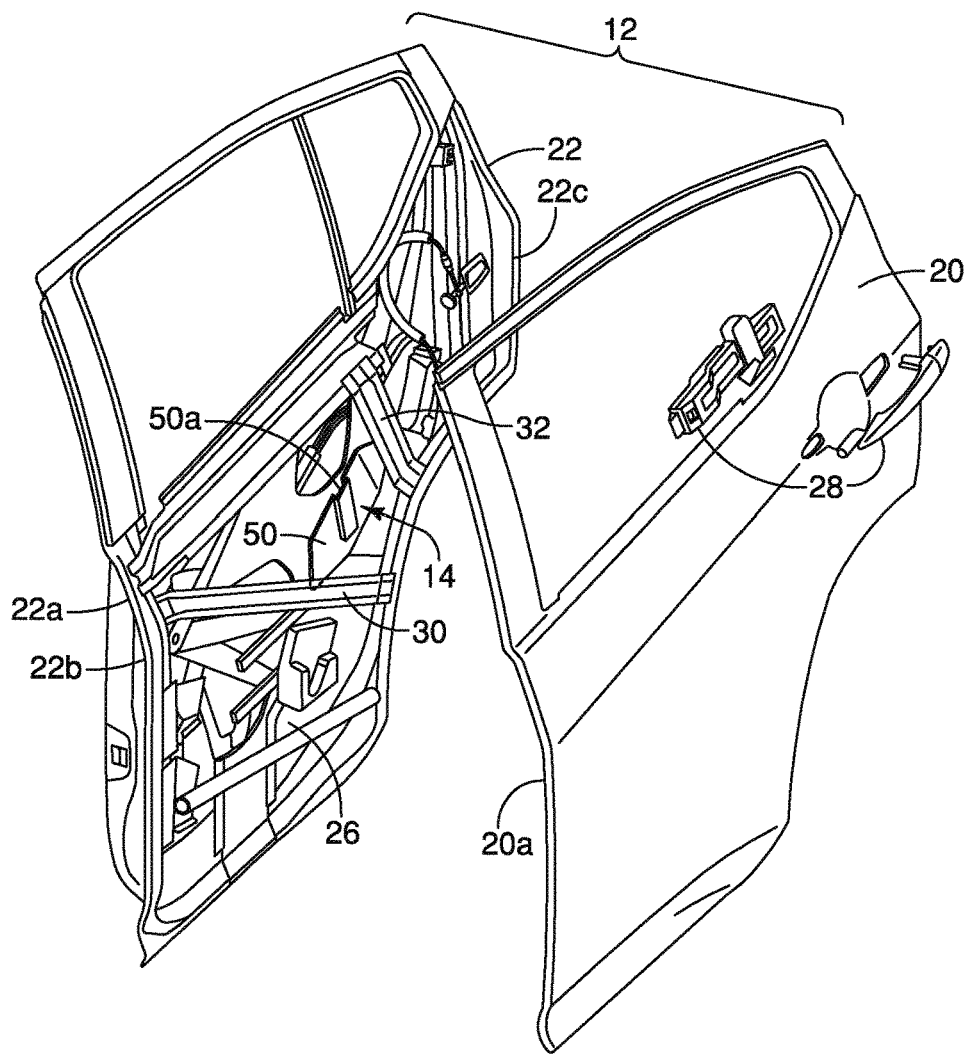
FIG. 2 is an exploded view of the door assembly removed from the vehicle showing an outer door panel, an inner door panel, a first reinforcing bracket, a second reinforcing bracket and a vibration absorbing member in accordance with the exemplary embodiment.

Referring initially to FIGS. 1 and 2, a vehicle 10 having a vehicle door assembly 12 (also referred to as either one of rear doors 12) with a vibration absorbing member 14 installed therein is illustrated in accordance with a first embodiment.

The vehicle 10 can be any of a variety of vehicle designs such as, a sports utility vehicle (SUV), a sedan, a coupe, a pick-up truck, commercial vehicle or van. In the depicted embodiment, the vehicle 10 is an SUV that includes a vehicle body structure 16, with front doors 18 (only one shown) and the two rear doors 12 (only one shown). The rear doors 12 are identical to one another, except that structurally they are symmetrical mirror images of one another. Since the rear doors 12 are identical to one another, only one door 12 is described hereinbelow with the description applying equally to both rear doors 12.

As shown in FIG. 2, the door 12 includes an outer door panel 20, an inner door panel 22 and the vibration absorbing member 14. An outer peripheral area 20a of the outer door panel 20 is attached to a corresponding outer peripheral area 22a of the inner door panel 22 in a conventional manner defining an interior cavity 26 therebetween. The outer door panel 20 also includes a conventional door handle mechanism 28, as shown in FIGS. 1 and 2.

Figure 3:
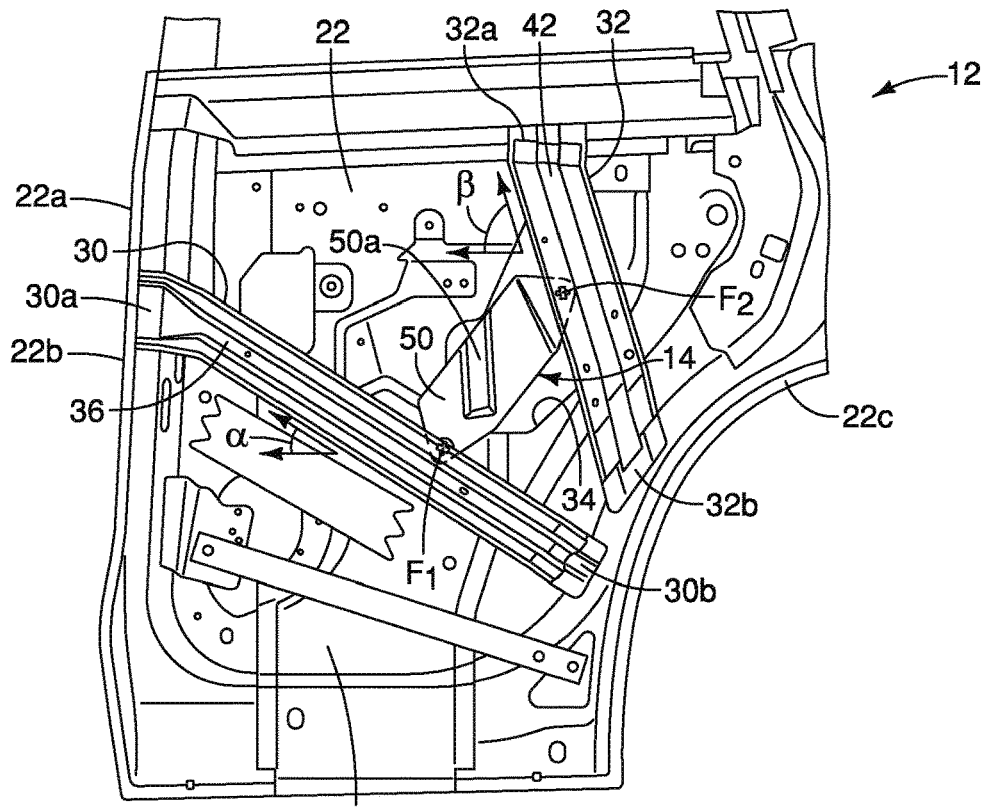
FIG. 3 is a side view of the door assembly with the outer door panel removed showing outboard facing surfaces of the inner door panel, the first reinforcing bracket, the second reinforcing bracket and the vibration absorbing member in accordance with the exemplary embodiment.

As shown in FIGS. 2 and 3, within the interior cavity 26, the inner door panel 22 includes at least a first reinforcing bracket 30 and a second reinforcing bracket 32. The inner door panel also includes an access opening 34 that is shown in FIG. 3.

The first reinforcing bracket 30 has a first end 30a and a second end 30b. The first end 30a is attached to a forward portion 22b of the outer peripheral area 22a. The second end 30b is attached to a rearward portion 22c of the outer peripheral area 22a at a location that is vertically lower than the forward portion 22b, as shown in FIG. 3. Hence, the first reinforcing bracket 30 extends from the forward portion 22b of the inner door panel 22 to the rearward portion 22c of the inner door panel 22. The first reinforcing bracket 30 has a first main surface 36 and a second main surface 38 opposite the first main surface 36. In the depicted embodiment, the first main surface 36 is an outboard facing surface and the second main surface 38 is an inboard facing surface relative to the vehicle 10.

The second reinforcing bracket 32 has a first end 32a and a second end 32b. The first end 32a (also referred to as an upper end) is attached to a window slot support bracket 40 of the inner door panel 22. The second end 32b is attached to the rearward portion 22c of the outer peripheral area 22a at a location that is vertically higher than the second end 30b of the first reinforcing bracket 30, as shown in FIG. 3. Hence, the second reinforcing bracket 32 extends from window slot support bracket 40 of the inner door panel 22 to the rearward portion 22c of the inner door panel 22. The second reinforcing bracket 32 has a first main surface 42 and a second main surface 44 opposite the first main surface 42.

In the depicted embodiment, the first main surface 42 is an outboard facing surface and the second main surface 44 is an inboard facing surface relative to the vehicle 10.

As shown in FIGS. 1 and 3, the arrowed line $L_D$ represents a vehicle lengthwise direction $L_D$ of the vehicle 10. The vehicle lengthwise direction $L_D$ also represents a horizontal direction such that when the vehicle 10 is on level ground, the vehicle 10 extends horizontally in the vehicle lengthwise direction $L_D$. As shown in FIG. 3, the first reinforcing bracket 30 and the second reinforcing bracket 32 are not level or vertical (perpendicular to horizontal) in that they each define an acute angle relative to horizontal (the vehicle lengthwise direction $L_D$). Specifically, with the vehicle 10 on level ground (horizontal ground), the first reinforcing bracket 30 defines an acute angle $\alpha$ with horizontal level ground and the second reinforcing bracket 32 defines an acute angle $\beta$ with horizontal level ground. As shown in FIG. 3, the angle $\beta$ is larger than the angle $\alpha$. Preferably, the angle $\alpha$ is between 15 and 45 degrees. In the depicted embodiment the angle $\alpha$ is approximately 30 degrees. Preferably, the angle $\beta$ between 55 and 85 degrees. In the depicted embodiment, the angle $\beta$ is approximately 70 degrees.

A description is now provided of the vibration absorbing member 14 with specific reference to FIGS. 3-13 and 21.

The vibration absorbing member 14 is an energy absorbing member that is attached to both the first reinforcing member 30 and the second reinforcing member 32, as described below. More specifically, the vibration absorbing member 14 is attached to the second main surface 38 (inboard facing surface) of the first reinforcing member 30 and the second main surface 44 (inboard facing surface) of the second reinforcing bracket 32, as shown in FIGS. 3-6.

The vibration absorbing member 14 has a main body 50, a first end 52 and a second end 54. The main body 50, first end 52 and the second end 54 of the vibration absorbing member 14 are formed as a single block element that is unitary, homogenous element. The vibration absorbing member 14 defines an outer peripheral edge 58 that extends around the outer periphery thereof. The vibration absorbing member 14 is made of a polymer-based foam material such as, for example, a polypropylene foam. However, it should be understood that other suitable materials may be added to the polymer-based foam material or used instead of the polymer-based foam material.

The main body 50 of the vibration absorbing member 14 is a generally flat shaped block like portion of the vibration absorbing member 14 but can include offset portions such as an offset portion 50a dimensioned and located for any of a variety of purposes, such as to strengthen the vibration absorbing member 14 or to make space for an internal door element or structure. Otherwise, both inboard and outboard facing surfaces of the vibration absorbing member 14 are generally flat or planar.

The first end 52 of the vibration absorbing member 14 includes a slot 60 that extends inward and upward from a lower portion of the outer peripheral edge 58 into and along the first end 52. The slot 60 is dimensioned and shaped for sliding installation on to a fastener $F_1$ such that the first end 52 of the vibration absorbing member 14 is located between a head portion 64 of the fastener $F_1$ and the first main surface 36 of the first reinforcing bracket 30. The fastener $F_1$ is installed to the first reinforcing bracket 30 prior to installation of the vibration absorbing member 14, as is described in greater detail below.

Figure 7:
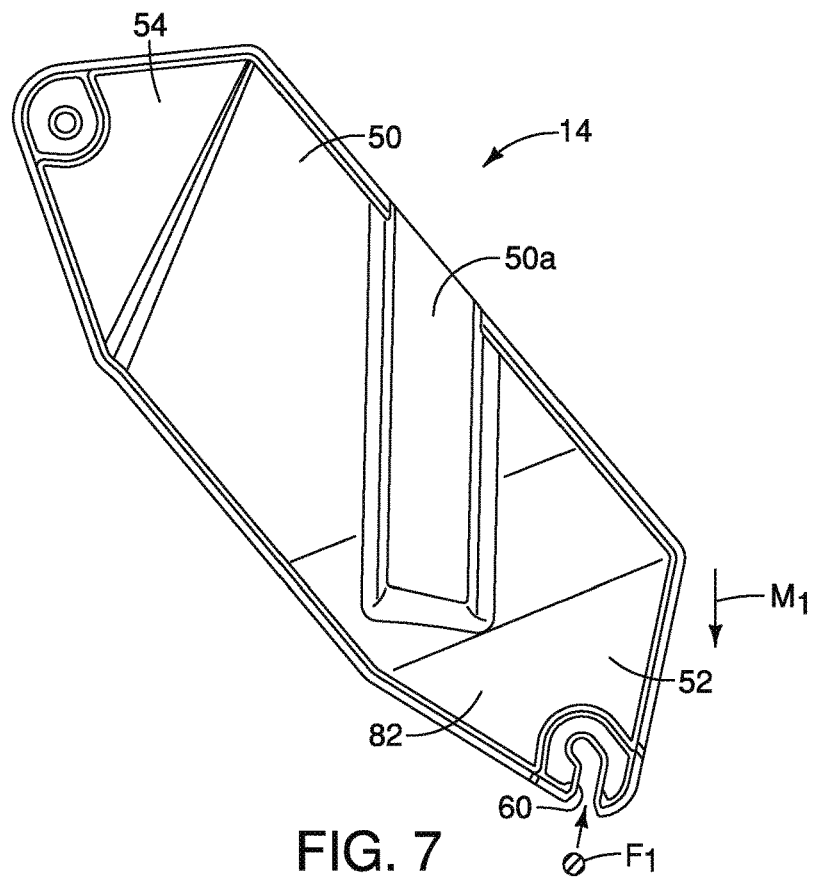
FIG. 7 is a side view of an inboard facing surface of the vibration absorbing member removed from the vehicle door showing a slot formed at a first end (a lower end) in accordance with the exemplary embodiment.
Figure 9:
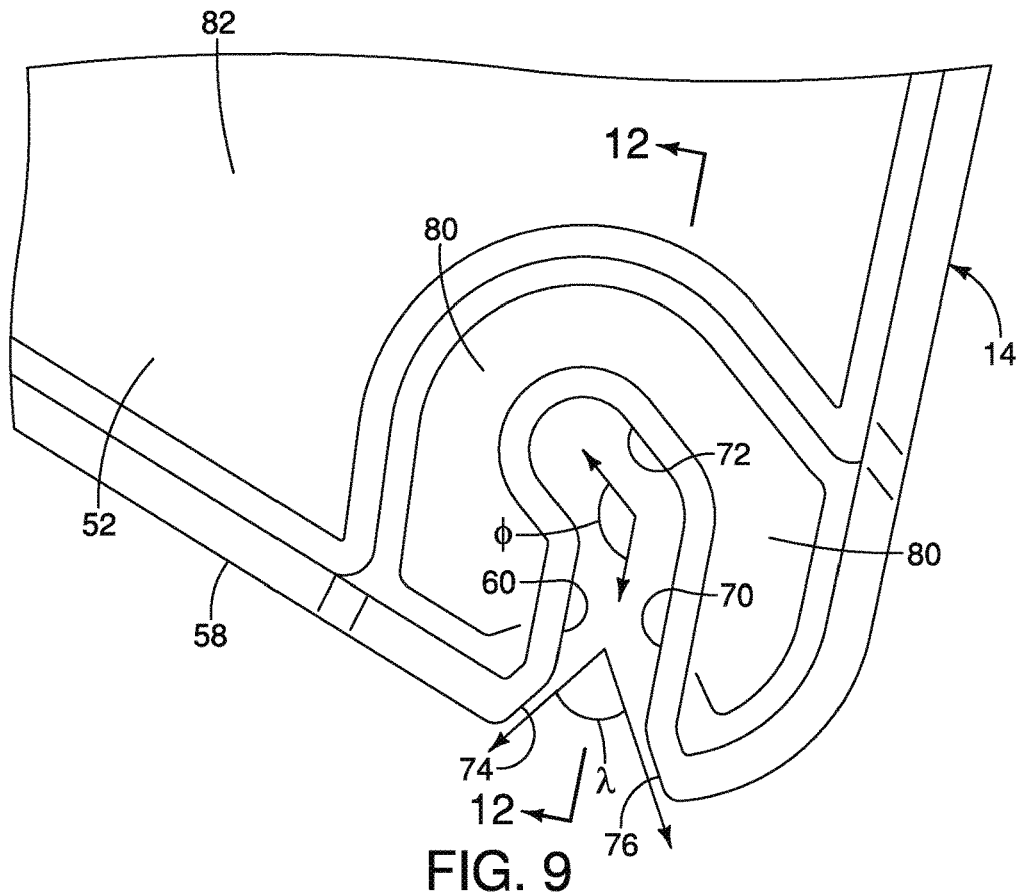
FIG. 9 is a side view of a lower portion of the inboard facing surface of the vibration absorbing member showing details of the slot in accordance with the exemplary embodiment.
Figure 10:
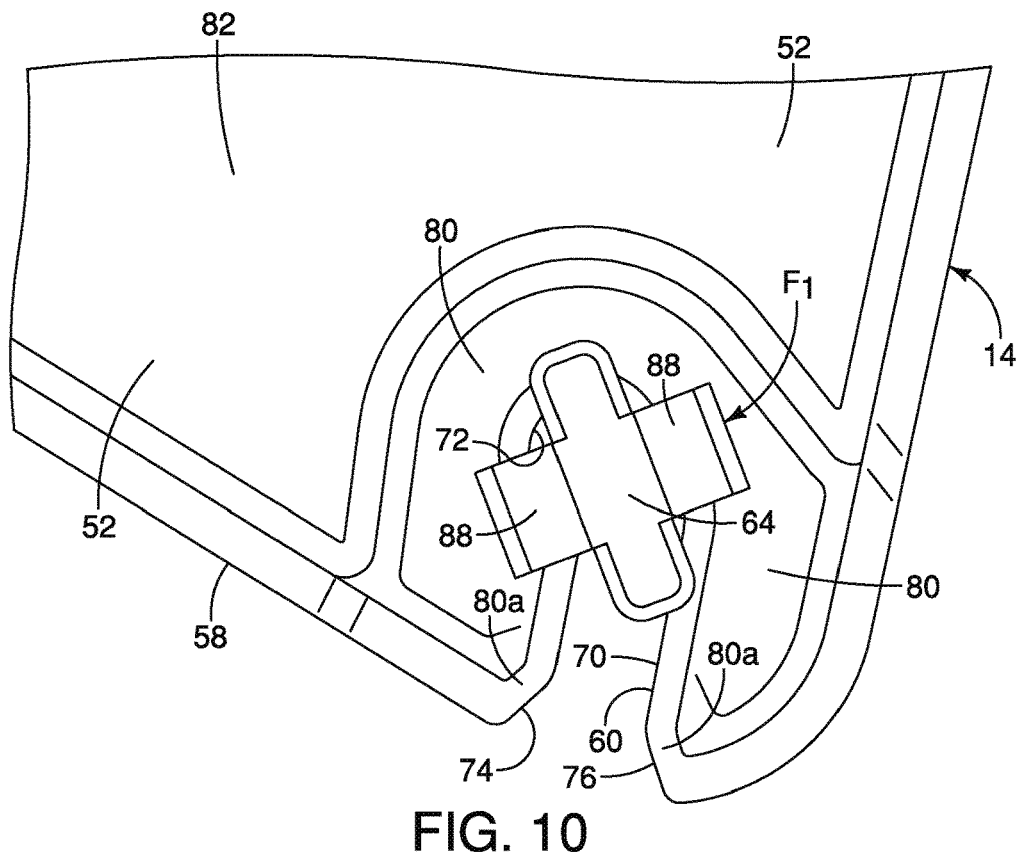
FIG. 10 is another side view of the lower portion of the inboard facing surface of the vibration absorbing member showing the fastener within the slot in accordance with the exemplary embodiment.

As shown in FIGS. 7 and 9, the slot 60 has a first section 70 and a second section 72 that define an obtuse angle $\phi$ therebetween. Hence, the slot 60 is a non-linear slot. The first section 70 extends from the edge 58 of the first end 52 in a first direction and a second section 72 extends from the first section 70 in a second direction and is angularly offset from the first section 70 by the angle φ (an obtuse angle). The obtuse angle φ is preferably between 95 and 160 degrees. Further, the obtuse angle φ can further be limited to being between 110 and 135 degrees. In the depicted embodiment, the obtuse angle φ is approximately 135 degrees.

At the intersection of the outer peripheral edge 58 and the first section 70 of the slot 60, the first section 70 defines a first surface portion 74 and a second surface portion 76 that diverge in a direction going out of the non-linear slot 60 toward the edge 58. The first surface portion 74 and the second surface portion 76 define an angle λ therebetween that is between 30 degrees and 90 degrees. However, the angle λ can be between 70 degrees and 85 degrees. In the depicted embodiment, the angle λ is approximately 80 degrees.

Figure 11:
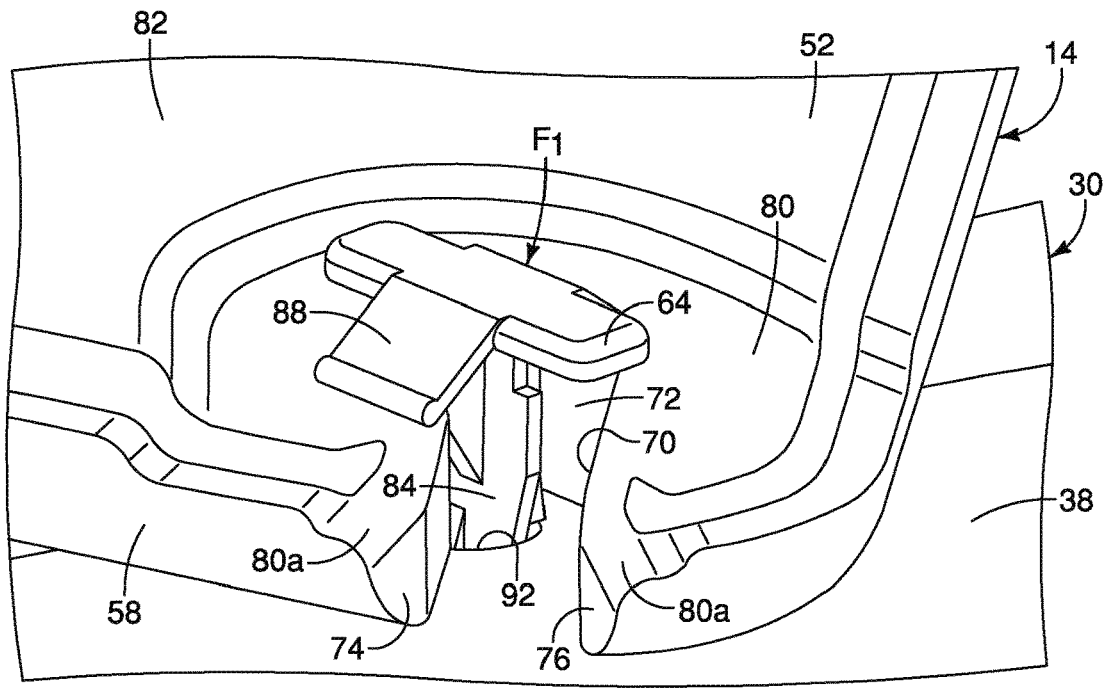
FIG. 11 is a perspective view of the lower portion of the vibration absorbing member showing the fastener within the slot along with surface features of the vibration absorbing member in accordance with the exemplary embodiment.
Figure 12:
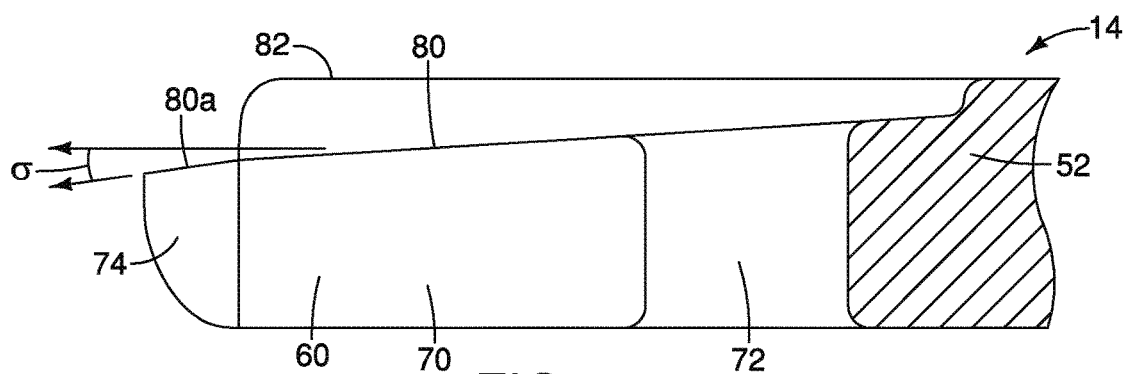
FIG. 12 is a side cross-sectional view of the lower portion of the vibration absorbing member showing further surface features of the vibration absorbing member in accordance with the exemplary embodiment.
Figure 13:
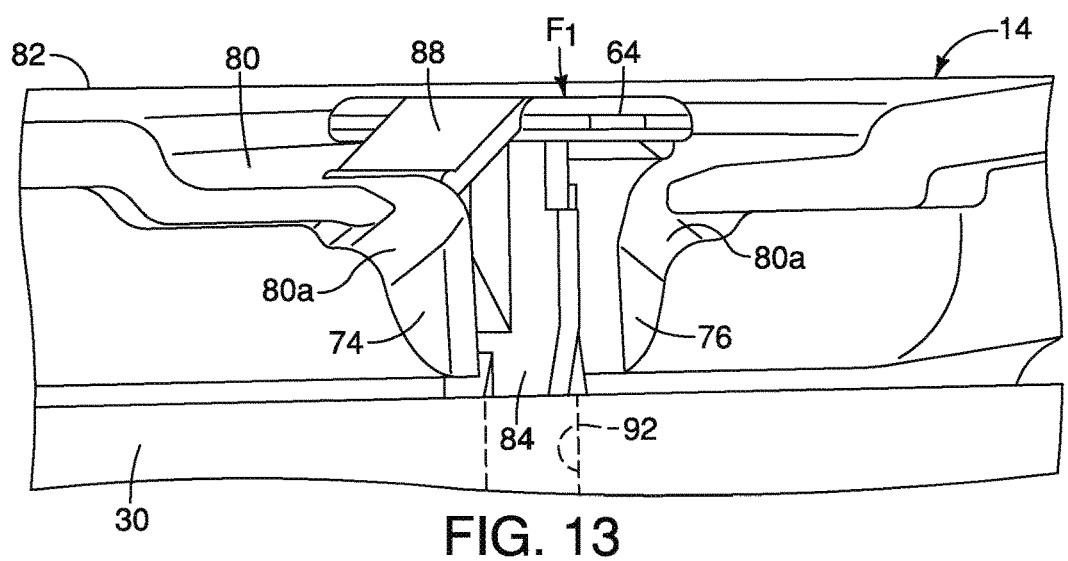
FIG. 13 is a bottom view of the lower portion of the vibration absorbing member showing the fastener within the slot along with surface features of the vibration absorbing member in accordance with the exemplary embodiment.
Figure 14:
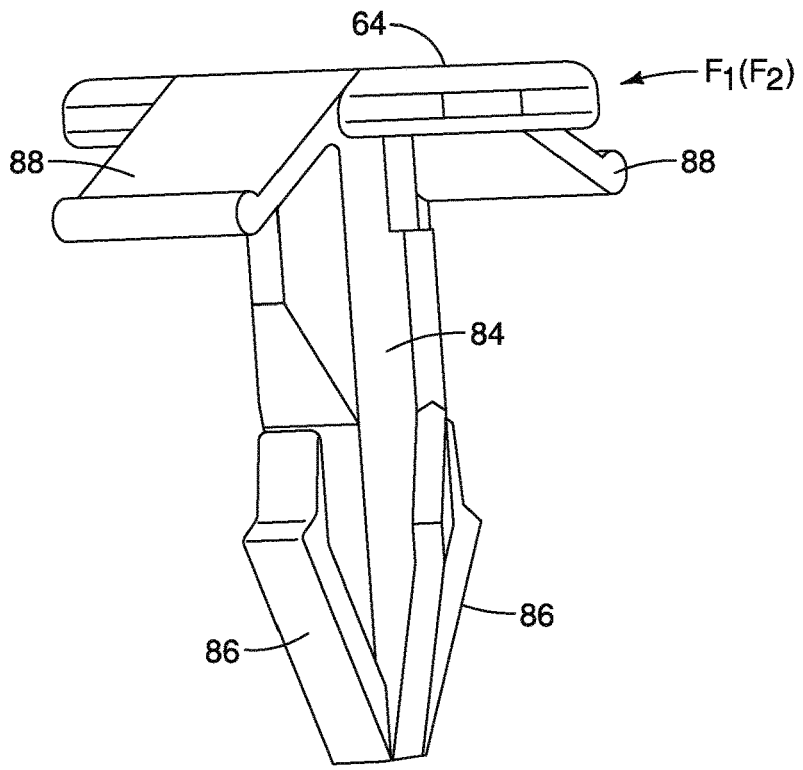
FIG. 14 is a side view of the fastener removed from the vehicle door in accordance with the exemplary embodiment.
Figure 15:
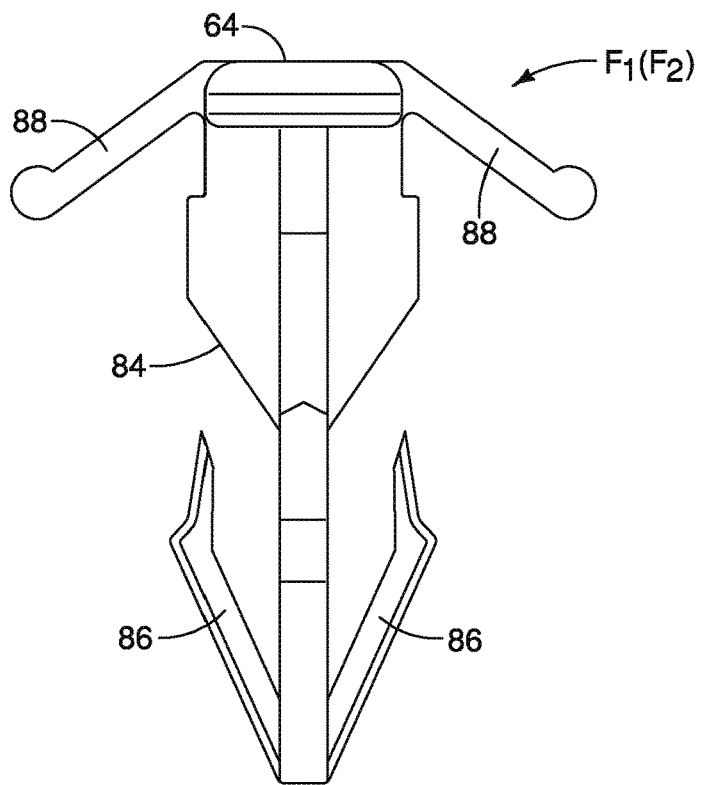
FIG. 15 is another side view of the fastener in accordance with the exemplary embodiment.
Figure 16:
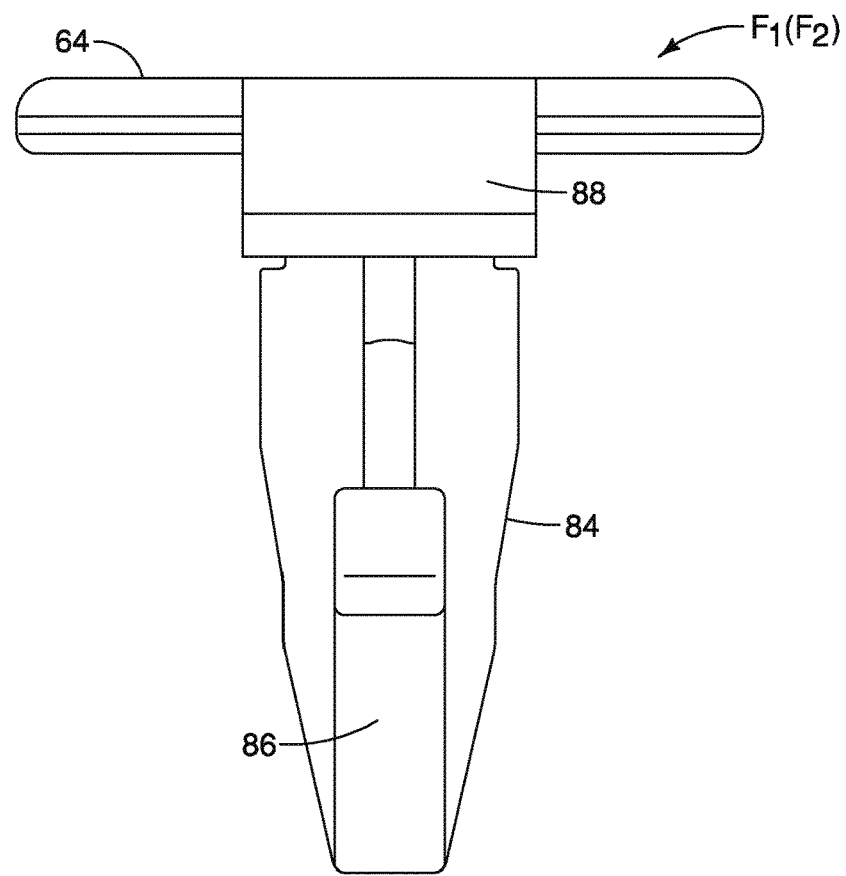
FIG. 16 is a back side view of the fastener in accordance with the exemplary embodiment.
Figure 17:
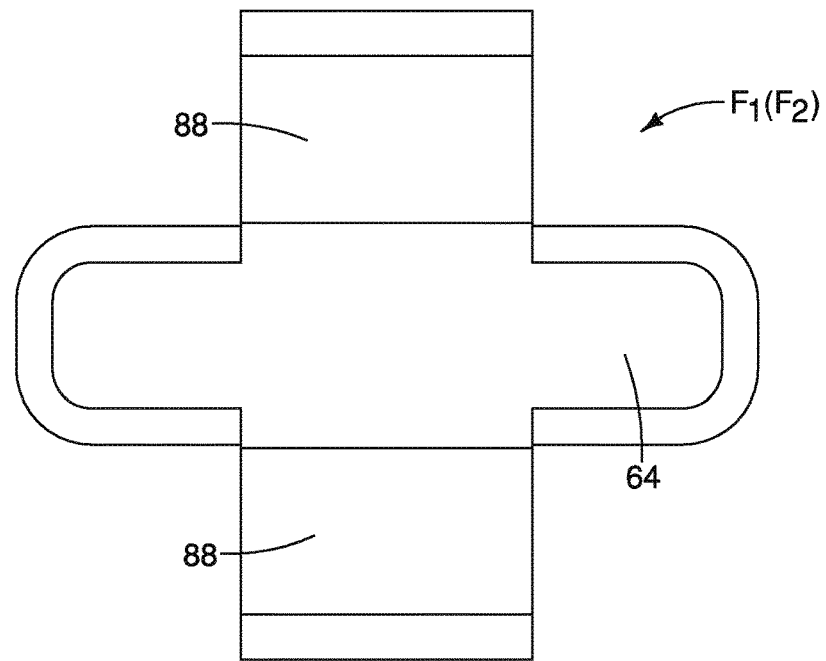
FIG. 17 is a top view of the fastener in accordance with the exemplary embodiment.
Figure 21:
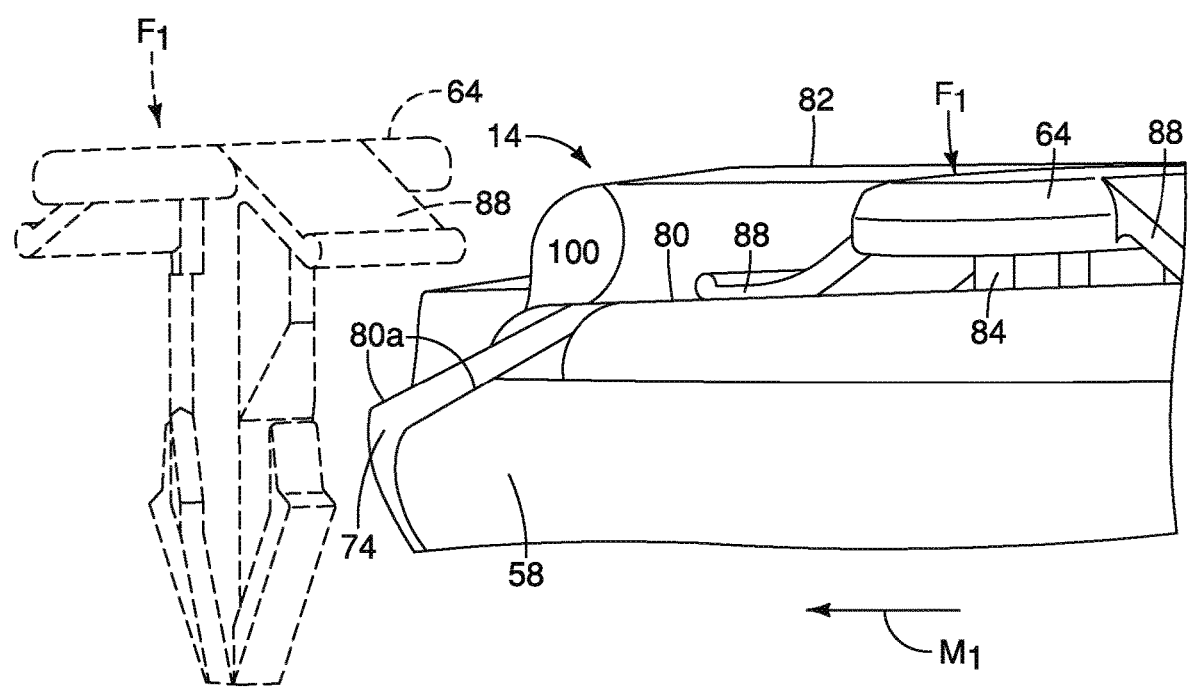
FIG. 21 is a side view of the first end of the vibration absorbing member showing the fastener in phantom prior to attachment of the vibration absorbing member to the fastener and the fastener and the vibration absorbing member fully installed to one another in accordance with the exemplary embodiment.

As shown in FIGS. 11-13, the first end 52 of the vibration absorbing member 14 includes a concaved area 80 that is offset from a main surface 82 of the main body 50 and the first end 52 of the vibration absorbing member 14. As shown in FIG. 12, the concaved area 80 has a generally flat surface. Further, the flat surface of the concaved area 80 is inclined relative to the main surface 82. More specifically, the concaved area 80 and the main surface 82 define an angle σ therebetween that is between 1 and 15 degrees. In the depicted embodiment, the angle σ is approximately 5 degrees. The concaved area 80 also includes end surfaces 80a adjacent to the first and second surface portions 74 and 76 of the slot 60, as shown in FIGS. 12, 13 and 21. The end surfaces 80a are further inclined relative to the concaved area 80.

The vibration absorbing member 14 is fixed to the first and second reinforcing brackets 30 and 32 by fasteners $F_1$ and $F_2$, respectively. The fasteners $F_1$ and $F_2$ are identical. Since the fasteners $F_1$ and $F_2$ are identical, description of one fastener applies equally to both fasteners $F_1$ and F2. A description of the fastener $F_1$ is provided with reference to FIGS. 14-20.

Figure 18:
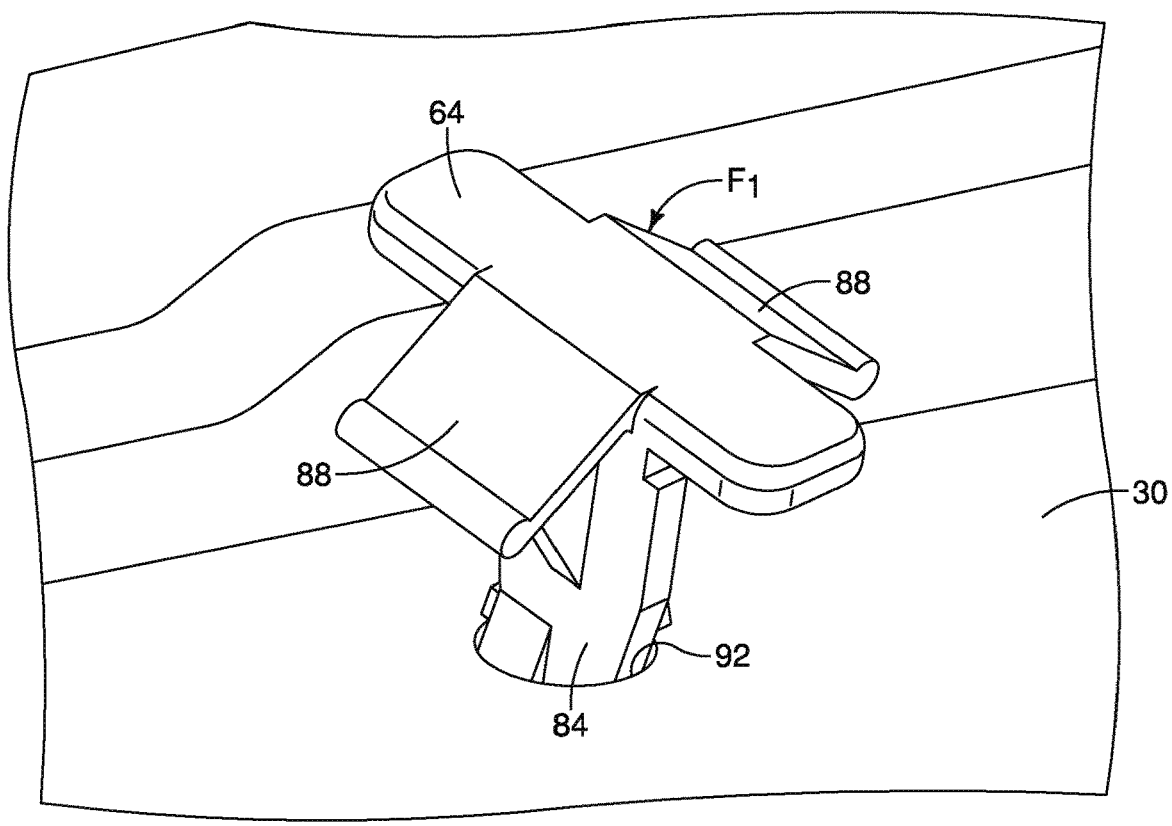
FIG. 18 is a perspective view of the first reinforcing bracket with the fastener installed in an opening in the first reinforcing bracket showing the head of the fastener spaced apart from a main surface of the first reinforcing bracket in accordance with the exemplary embodiment.
Figure 19:
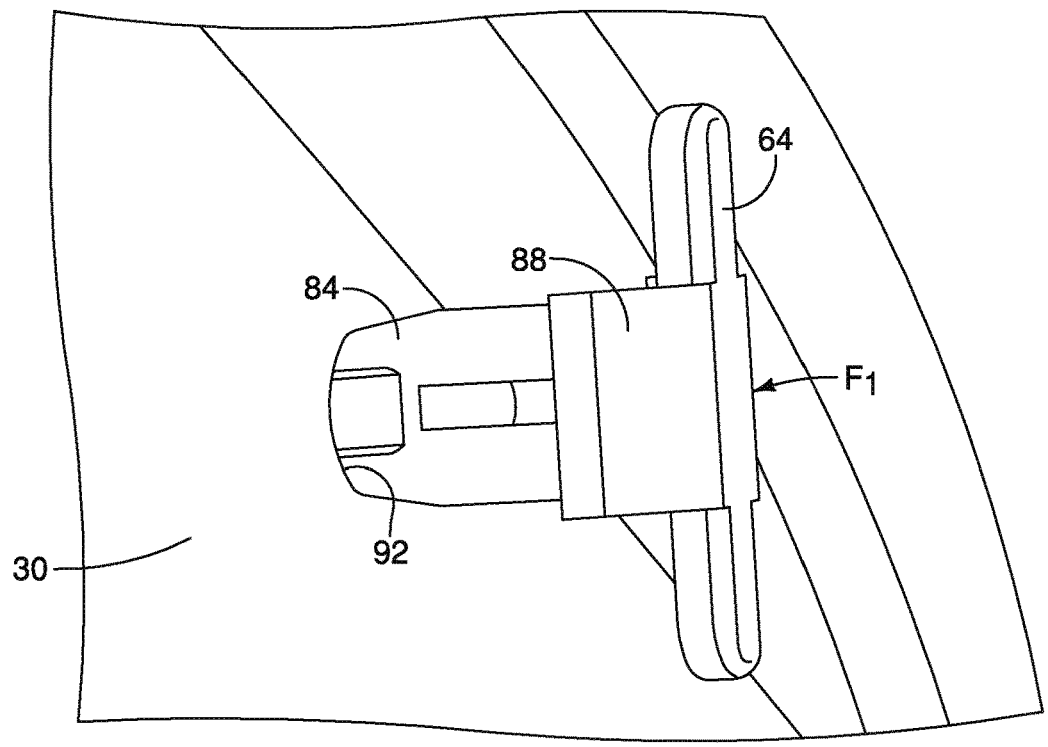
FIG. 19 is another perspective view of the first reinforcing bracket with the fastener installed in the opening in the first reinforcing bracket showing the head of the fastener spaced apart from a main surface of the first reinforcing bracket in accordance with the exemplary embodiment.
Figure 20:
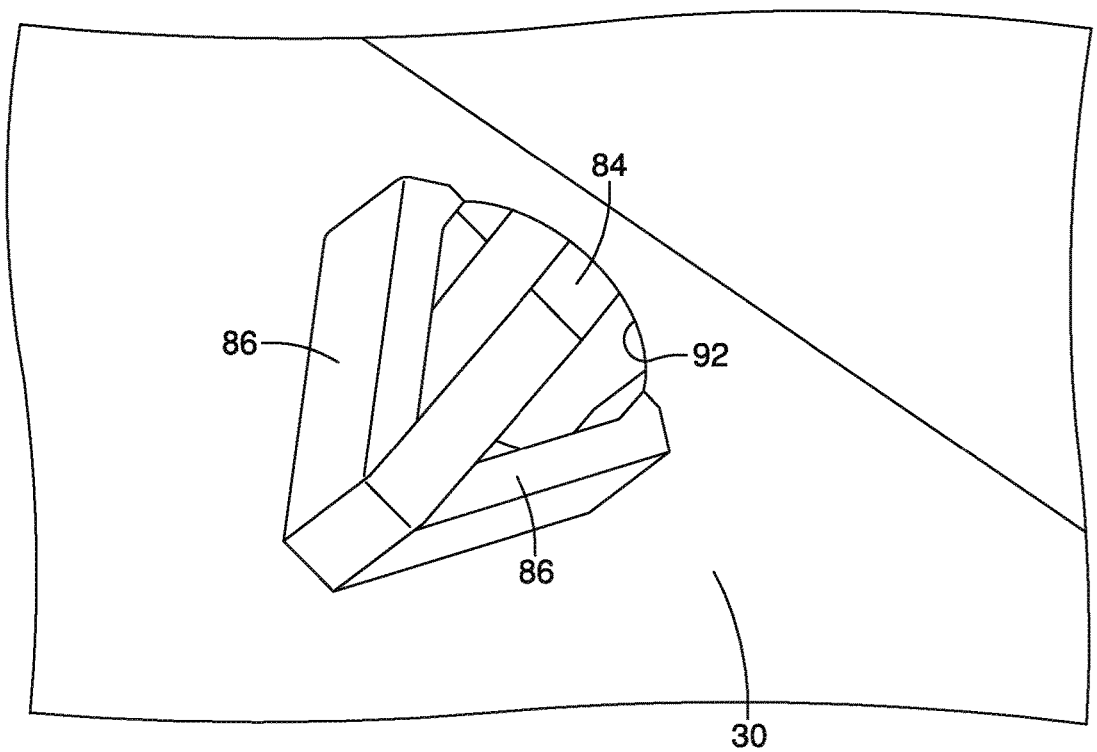
FIG. 20 is another perspective view of the first reinforcing bracket with the fastener installed in the opening in the first reinforcing bracket showing fastening wings of the fastener contacting a surface of the first reinforcing bracket thereby retaining the fastener to the first reinforcing bracket in accordance with the exemplary embodiment.

As shown in FIGS. 14-17, the fastener $F_1$ includes the head portion 64, a tapering shaft portion 84, a pair of fastening wings 86 and a pair of biasing wings 88. The tapering shaft portion 84 is dimensioned such that when inserted into the opening 92 in the first reinforcing bracket 30 (or the opening 94 in the second reinforcing bracket 32) the fastening wings 86 deflect during insertion through the opening 92, then resume their original orientation thereby locking the fastener $F_1$ to the first reinforcing bracket 30, as shown in FIG. 20. The tapering shaft portion 84 is dimensioned relative the diameter of the opening 92 such that only a portion of the tapering shaft portion 84 fits through the opening 92. More specifically, the tapering shaft portion 84 allows insertion into the opening 92 such that the fastening wings 86 can move outward to retain the fastener $F_1$ to the first reinforcing bracket 30 but restricts further movement of the fastener $F_1$ into the opening 92. In other words, only a portion of the tapering shaft portion 84 can fit through the opening 92, as shown in FIGS. 18 and 19. Therefore, a significant gap is defined between the head portion 64 of the fastener $F_1$ and the second main surface 38 (inboard facing) of the first reinforcing bracket 30, as shown in FIGS. 18 and 19.

The inclusion of the fastening wings 86 make the fasteners $F_1$ and $F_2$ snap-fitting fasteners.

Figure 4:
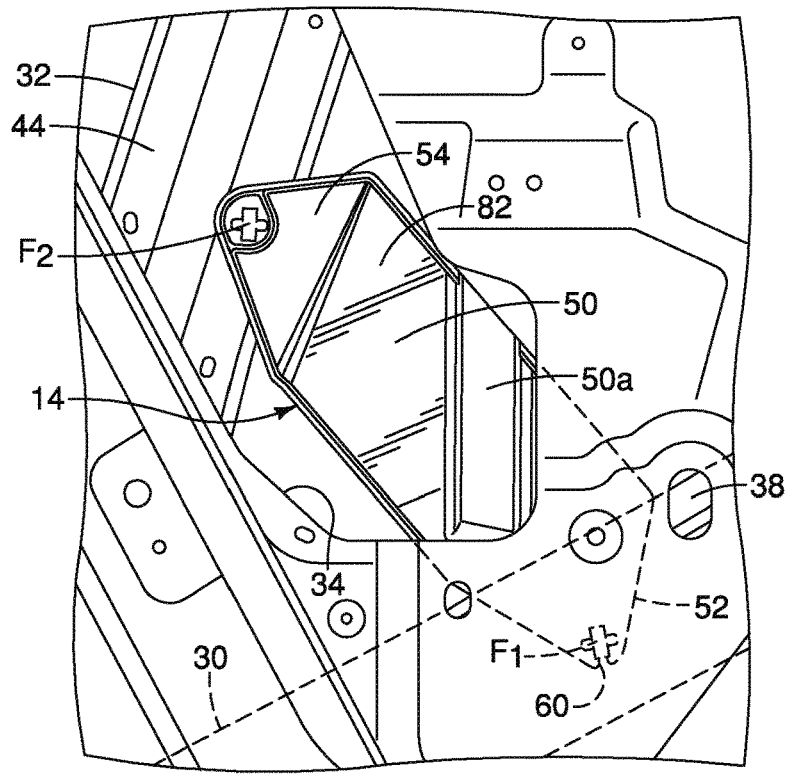
FIG. 4 is a side view of a portion of the vehicle door showing inboard facing surface of the inner door panel, the first reinforcing bracket, the second reinforcing bracket and the vibration absorbing member in accordance with the exemplary embodiment.
Figure 5:
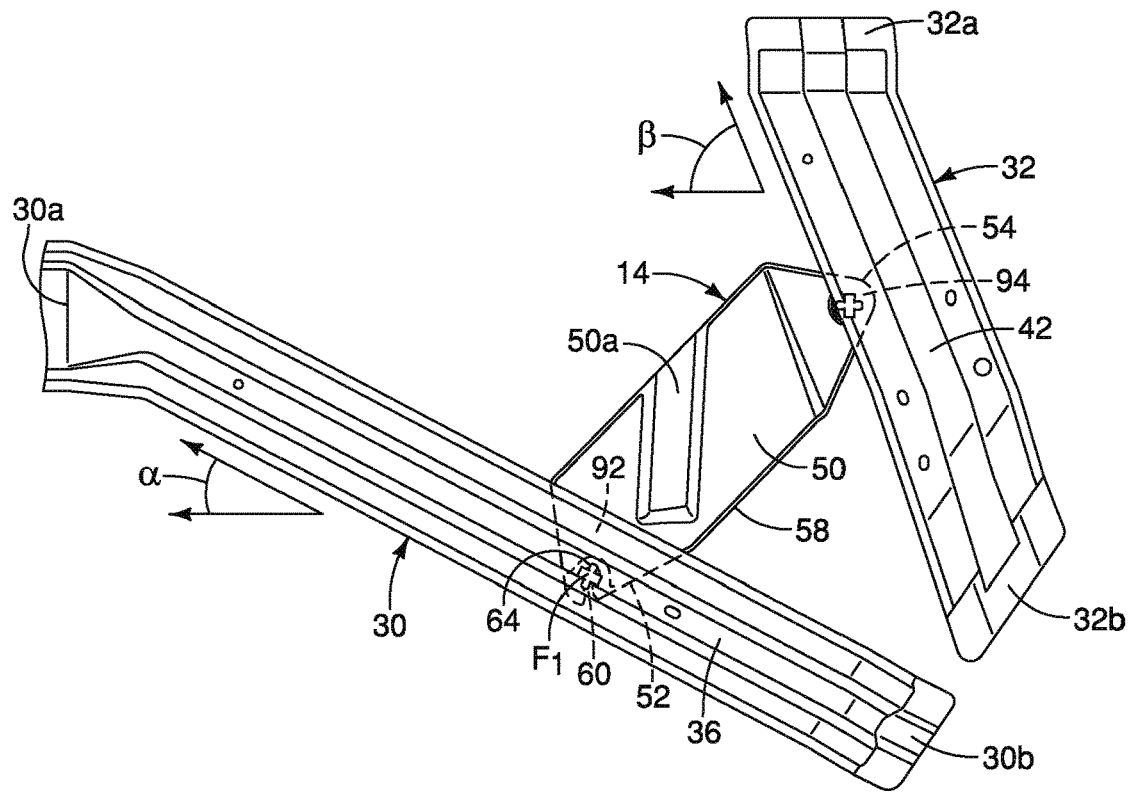
FIG. 5 is a side view of outboard facing surfaces of the first reinforcing bracket, the second reinforcing bracket and the vibration absorbing member removed from the vehicle door in accordance with the exemplary embodiment.
Figure 6:
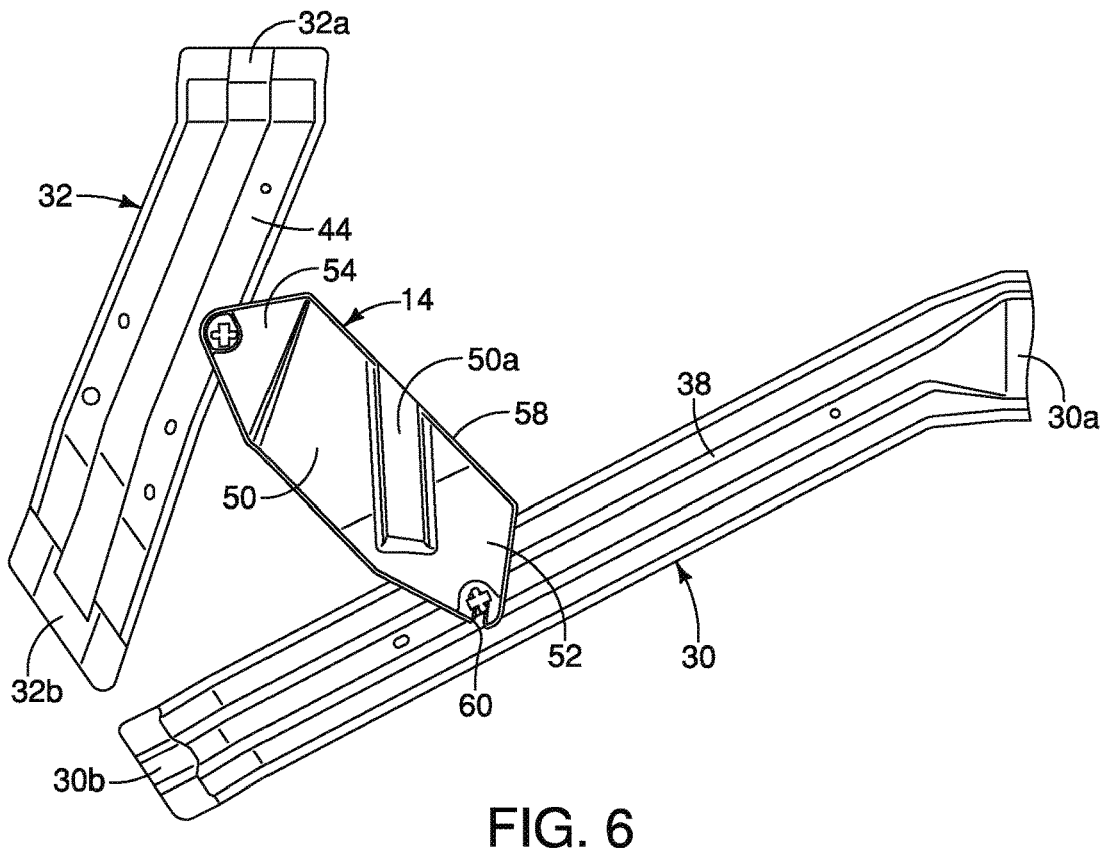
FIG. 6 is a side view of inboard facing surfaces of the first reinforcing bracket, the second reinforcing bracket and the vibration absorbing member removed from the vehicle door in accordance with the exemplary embodiment.

The vibration absorbing member 14 is installed to the first reinforcing bracket 30 and the second reinforcing bracket 32 within the interior cavity 26 of the door 12 in a predetermined manner. In the following description it should be noted that FIG. 3 is a view of the door 12 with the outer door panel 20 removed to show the structures that are part of the inner door panel 22. In other words, FIG. 3 is a view of an outboard side of the inner door panel 22. FIG. 4, on the other hand, is a view of an inboard side of a portion of the inner door panel 22.

First, the fastener $F_1$ is installed to the second main surface 38 (inboard facing side) of the first reinforcing bracket 30. The area where the opening 92 of the first reinforcing bracket 30 is not visible from the second main surface 38, as is shown in FIG. 4. Therefore, a technician installing the fastener $F_1$ must put his/her hand through the opening 34 in the inner door panel 22 and reach down to install the fastener $F_1$. As noted above and shown in FIGS. 18 and 19, the head portion 64 is spaced apart from the second main surface 38 of the first reinforcing bracket 30. The distance between the head portion 64 and the second main surface 38 of the first reinforcing bracket 30 is sufficient to allow the technician to place the first end 52 of the vibration absorbing member 14 above the fastener $F_1$.

Figure 8:
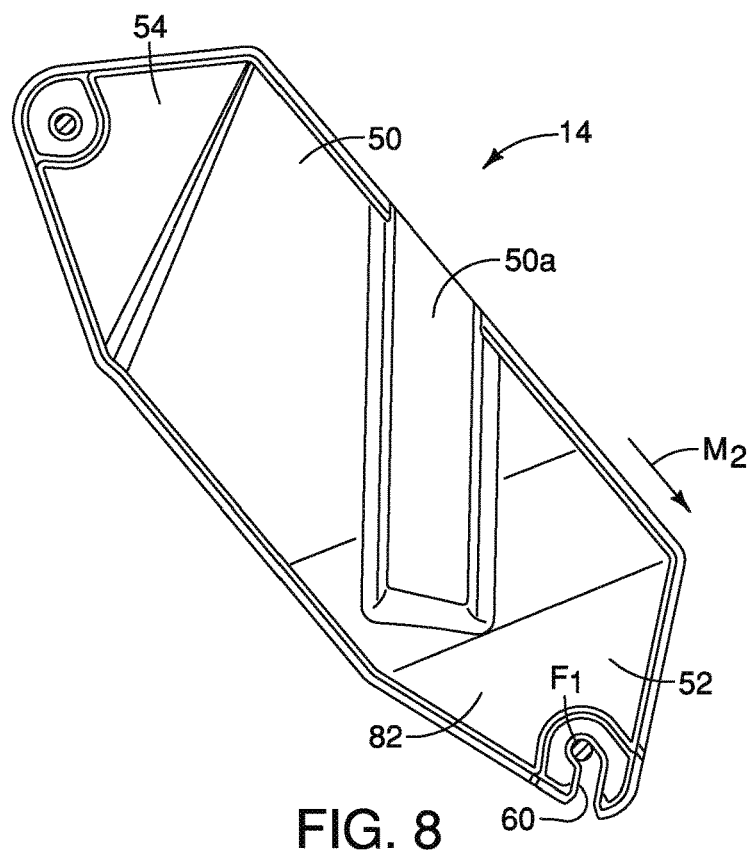
FIG. 8 is a side view of an inboard facing surface of the vibration absorbing member removed from the vehicle door showing the slot with a fastener located within an upper most end of the slot in accordance with the exemplary embodiment.

Then the vibration absorbing member 14 is moved downward in an $M_1$ direction shown in FIGS. 7 and 21 such that the slot 60 receives the fastener $F_1$. In other words, the first end 52 of the vibration absorbing member 14 is moved in the direction $M_1$ to allow the tapering shaft portion 84 to contact the first surface portion 74 or the second surface portion 76 at the mouth of the slot 60. Continued movement in the $M_1$ direction of the vibration absorbing member 14 pushes the first end 52 of the vibration absorbing member 14 such that the tapering shaft portion 84 of fastener $F_1$ is now in the first section 70 of the slot 60 of the vibration absorbing member 14. Once the technician determines that the tapering shaft portion 84 is retained in the first section 70 of the slot 60, the technician now moves the vibration absorbing member 14 in the $M_2$ direction, as shown in FIG. 8. As shown in FIG. 8, the tapering shaft portion 84 of the fastener $F_1$ is now at an upper most location within the slot 60.

While the vibration absorbing member 14 is being moved in the $M_1$ direction and the tapering shaft portion 84 begins to move into the slot 60, the biasing wings 88 can first contact one or both of the end surfaces 80a on either side of the slot 60. Since the end surfaces 80a are tapering or inclined surfaces, they can guide relative movement between the first end 52 of the vibration absorbing member 14 and the biasing wings 88 of the fastener $F_1$ as the tapering shaft portion 84 begins to move into the slot 60. Further relative movement between the first end 52 of the vibration absorbing member 14 and the biasing wings 88 of the fastener $F_1$ causes the biasing wings 88 to contact the inclined surface of the concaved area 80 aiding the biasing wings 88 to deflect slightly once the fastener $F_1$ is fully installed in the slot 60 with the tapering shaft portion 84 at the upper end of the second section 72 of the slot 60. The deflection of the biasing wings 88 causes the resilient material of the fastener $F_1$ to maintain a permanent biasing force between the biasing wings 88 and the first end 52 of the vibration absorbing member 14. In other words, the biasing wings 88 press the first end 52 of the vibration absorbing member 14 against the second main surface 38 of the first reinforcing bracket 30.

Once the first end 52 of the vibration absorbing member 14 is installed to the fastener $F_1$, the technician can push the fastener $F_2$ into the opening of the second end 54 of the vibration absorbing member 14 and further through the opening 94 of the second reinforcing bracket 32, thus completing the installation of the vibration absorbing member 14.

The slot 60 and the surrounding surfaces of the first end 52 of the vibration absorbing member 14 make installation of the vibration absorbing member 14 easier for the technician installing the vibration absorbing member 14. Since both the first section 70 and the second section 72 of the slot 60 have downward inclinations, the vibration absorbing member 14 is more easily moved in the $M_1$ and $M_2$ directions during installation since gravity aids in pulling the vibration absorbing member 14 downward relative to the fastener $F_1$.

Further, since the slot 60 is located at a bottom most area of the vibration absorbing member 14, gravity helps retain the vibration absorbing member 14 in position.

Since the slot 60 has the first section 70 and the second section 72 in a non-linear relationship (the angle $\phi$ defined therebetween), during an impact event the likely hood of the fastener $F_1$ coming out of the slot 60 is prevented since differing directional movements ($M_1$ and $M_2$) are required to remove the vibration absorbing member 14 from the fastener $F_1$.

The vehicle body structures of the vehicle 10, other than the vibration absorbing member 14, the first reinforcing bracket 30 and the second reinforcing bracket 32, are conventional components that are well known in the art. Since such structures are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle door structure. Accordingly, these terms, as utilized to describe the present invention should be interpreted relative to a vehicle equipped with the vehicle door structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
    an outer door panel;
    an inner door panel having an outer periphery fixed to a corresponding outer periphery of the outer door panel such that the outer and inner door panels define a cavity therebetween;
    a first reinforcing bracket extending from a forward portion of the inner door panel to a rearward portion of the inner door panel, the first reinforcing bracket having a first main surface and a second main surface opposite the first main surface;
    a fastener attached to the first reinforcing bracket such that a head portion thereof is spaced apart from of the first main surface of the first reinforcing bracket; and
    a vibration absorbing member having a main body with a first end and a second end, the first end having a slot that extends from an edge of the first end inward, the slot being dimensioned and shaped for sliding installation on to the fastener such that the first end of the vibration absorbing member is located between the head portion of the fastener and the first main surface of the first reinforcing bracket.

2. The vehicle door assembly according to claim 1, wherein
    the slot is a non-linear slot.

3. The vehicle door assembly according to claim 2, wherein
    the non-linear slot has a first section that extends from the edge of the first end in a first direction and a second section that extends from the first section in a second direction angularly offset from the first direction.

4. The vehicle door assembly according to claim 3, wherein
    the first section and the second section are angularly offset from one another by an obtuse angle.

5. The vehicle door assembly according to claim 4, wherein
    the obtuse angle between the first section and the second section is between 95 and 160 degrees.

6. The vehicle door assembly according to claim 4, wherein
    the obtuse angle between the first section and the second section is between 110 and 135 degrees.

7. The vehicle door assembly according to claim 3, wherein
    the first section of the slot has a first surface portion and a second surface portion that diverge in a direction going from a main area of the non-linear slot toward the edge of the first end outward.

8. The vehicle door assembly according to claim 7, wherein
the first surface portion and the second surface portion define an angle therebetween that is between 30 degrees and 90 degrees.

9. The vehicle door assembly according to claim 8, wherein
the angle defined between the first surface portion and the second surface portion is between 70 degrees and 85 degrees.

10. The vehicle door assembly according to claim 1, wherein
a first main surface of the first end of the main body of the vibration absorbing member includes a concaved area with the slot being defined along the concaved area to the edge of the first end.

11. The vehicle door assembly according to claim 10, wherein
the concaved area includes an inclined surface that defines an acute angle relative to the first main surface of the first end of the main body of the first reinforcing member.

12. The vehicle door assembly according to claim 11, wherein
the acute angle defined between the inclined surface and the first main surface of the first end of the main body of the first reinforcing member is between 2 and 15 degrees.

13. The vehicle door assembly according to claim 1, further comprising:
a second reinforcing bracket having an upper end fixedly attached to an upper portion of the inner door panel along a window slot thereof and another end attached to the rearward portion of the inner door panel above the first reinforcing bracket.

14. The vehicle door assembly according to claim 13, wherein
wherein the second end of the vibration absorbing member is attached to the second reinforcing bracket via a snap-fitting fastener.

15. The vehicle door assembly according to claim 1, wherein
the fastener is a snap-fitting fastener having fastening wings that are inserted into an opening in the first reinforcing bracket.

16. The vehicle door assembly according to claim 15, wherein
the fastener includes a tapering shaft portion with the head section being formed at a first end thereof and the fastening wings being formed at a second end thereof.

17. The vehicle door assembly according to claim 16, wherein
the opening in the first reinforcing bracket and the tapering shaft portion of the fastener are dimensioned such that with the fastening wings inserted through the opening and contacting the second main surface of the first reinforcing bracket, a tapering shaft portion prevents further movement of the fastener through the opening such that the head section is spaced apart from the first main surface of the first reinforcing bracket.

18. The vehicle door assembly according to claim 1, wherein
the main body, the first end and the second end of the vibration absorbing member are formed as a single monolithic unitary element.

19. The vehicle door assembly according to claim 18, wherein
the vibration absorbing member is formed from a polymer-based foam material.

20. The vehicle door assembly according to claim 18, wherein
the vibration absorbing member is formed of polypropylene foam.

* * * * *